United States Patent
Ito et al.

(10) Patent No.: US 6,700,125 B2
(45) Date of Patent: Mar. 2, 2004

(54) RADIOACTIVE DUST MONITOR

(75) Inventors: Yasuhisa Ito, Naka-gun (JP); Kenji Izaki, Naka-gun (JP); Tadayoshi Yoshida, Naka-gun (JP)

(73) Assignee: Japan Nuclear Cycle Development Institute, Ibaraki-ken (JP)

( * ) Notice: Subject to any disclaimer, the term of this patent is extended or adjusted under 35 U.S.C. 154(b) by 326 days.

(21) Appl. No.: 09/985,422

(22) Filed: Nov. 2, 2001

(65) Prior Publication Data

US 2003/0183769 A1 Oct. 2, 2003

(30) Foreign Application Priority Data

Apr. 25, 2001 (JP) ............................ 2001-128158

(51) Int. Cl.[7] ................................. G01T 1/20
(52) U.S. Cl. .................... 250/364; 250/361 R
(58) Field of Search .................. 250/364, 361 R, 250/336.1; 324/452, 455, 457, 459, 464

(56) References Cited

U.S. PATENT DOCUMENTS 3,679,973 A * 7/1972 Smith et al. ............ 324/71.1
4,312,180 A * 1/1982 Reif et al. ............... 60/39.091
2003/0015655 A1 * 1/2003 Ryden ...................... 250/253

FOREIGN PATENT DOCUMENTS

GB     967293     8/1964
JP     6-130153     5/1994
JP     8-122439     5/1996

* cited by examiner

*Primary Examiner*—David Porta
*Assistant Examiner*—Christine Sung
(74) *Attorney, Agent, or Firm*—Wenderoth, Lind & Ponack, L.L.P.

(57) ABSTRACT

A radioactive dust monitor comprising a dust collecting electrode serving also as a radiation detecting surface, an ionization line extending in air in a spaced relation with the dust collecting electrode and a radiation detection part. The radiation detection part is provided with a scintillator disposed close to said dust collecting electrode and a photoelectric conversion part converting light emitted from the scintillator into an electric signal. Dust in air is collected by the dust collecting electrode due to a corona discharge which is generated by applying a negative high voltage to the ionization line and by applying a positive high voltage to the dust collecting electrode, and light emitted from the scintillator due to radioactive rays radiated from the collected radioactive dust is detected by the photoelectric conversion part.

3 Claims, 2 Drawing Sheets

RADIOACTIVE DUST MONITOR

BACKGROUND OF THE INVENTION

The present invention relates to a radioactive dust monitor adopting an electrostatic collection type electric dust collection system, and more particularly to a radioactive dust monitor which includes a dust collecting electrode serving also as a radiation detection surface, an ionization line extending in air in a spaced relation with the dust collecting electrode and a radiation detection part and is capable of continuously measuring a rays radiated from dust collected on the dust collecting electrode. Since this apparatus is small and light-weighted and ensures a silent operation, it is useful for the measurement of the concentration of radioactive material in air in the vicinity of workers or in an operating environment as well as for the continuous measurement of the concentration of radioactive material in the inside of a glove box.

In nuclear fuel material handling facilities, for example, when unsealed radioactive material is handled, a radioactive dust monitor for measuring the concentration of radioactive material in air in an operating environment within a controlled area is used, in order to enable the early finding of the leakage of radioactive material from a glove box or the like and to reduce the internal exposure of workers at the time of contamination.

A conventional radioactive dust monitor adopts an air suction system, and is formed, for example, of a combination of a suction pump, a dust collection part collecting dust in air sucked by the suction pump and a radiation detection part detecting radioactive rays. That is, air is sucked with the use of the suction pump and the dust floating in air is collected by a filter paper in the dust collection part. Then, the radioactive material concentration of the collected dust is measured using the radiation detection part incorporated in the monitor.

However, in such a conventional radioactive dust monitor which employs the suction pump, there has been a drawback that the suction pump is heavy and large-sized and hence, the monitor lacks in portability. Further, since the conventional monitor has a movable portion, it has a structural problem in terms of the continuous running ability, noise and the like. Still further, it is difficult to avoid the discharge of sampled air. Due to these reasons, an area in which the conventional monitor can be installed is limited and, particularly, it is not suitable for use in the state that it is installed in a glove box.

SUMMARY OF THE INVENTION

It is an object of the present invention to provide a radioactive dust monitor which exhibits an excellent portability since the monitor can be miniaturized and light-weighted, ensures the silent operation, enables the stable continuous running for a long period since the monitor has no movable portion, and generates no exhaust, whereby an area in which the monitor can be installed can be enlarged.

It is another object of the present invention to provide a radioactive dust monitor which can strengthen the administration of the radioactive material concentration in air in a working environment so that the high measurement accuracy can be achieved.

The present invention is directed to a radioactive dust monitor comprising a dust collecting electrode serving also as a radiation detecting surface, an ionization line extending in air in a spaced relation with the dust collecting electrode and a radiation detection part. The radiation detection part being provided with a scintillator disposed close to the dust collecting electrode and a photoelectric conversion part converting light emitted from the scintillator into an electric signal.

In such a radioactive dust monitor having the structure described above, dust in air is collected by the dust collecting electrode due to a corona discharge which is generated by applying a negative high voltage to the ionization line and by applying a positive high voltage to the dust collecting electrode, and light emitted from the scintillator due to radioactive rays radiated from the collected radioactive dust is detected by the photoelectric conversion part.

The present invention is characterized by adopting an electrostatic collection type electric dust collection system in place of a conventional air suction pump system. As shown in FIG. 1, the electrostatic collection type electric dust collection is a system in which a negative high voltage is applied to an ionization line 10 and a positive high voltage is applied to a dust collecting electrode 12 to thereby generate a corona discharge by locally forming an area having a strong electric field, and thus dust 14 in air is ionized and the resulting ions are moved to the dust collecting electrode 12 due to the Coulomb force acting in the electrostatic field and the dust is collected on the front of the dust collecting electrode 12. In the radioactive dust monitor according to the present invention, this dust collecting electrode 12 also serves as a radiation detection surface so that the radioactive dust present in air is collected and is measured at the radiation detection part.

It is preferable to use a metal layer of a light shielding film as the dust collecting electrode. The light shielding film is disposed on a front surface of the scintillator to shield an external light. This light shielding film is to be constituted such that although the external light is shielded, the transmission of the radioactive rays (α rays) is allowed and is formed of a plastic film having a metal layer thereon, for example. The metal layer is used as the dust collecting electrode. In this case, it is preferable that the scintillator comprises a transparent substrate on a surface of which a scintillator layer is formed and the scintillator layer is disposed close to a back-surface side of the light shielding film. This is because, in the measurement of α rays, the distance between the scintillator and an object to be measured (radioactive dust) should be made as small as possible to obtain high efficient measurement.

The radiation detection part comprises a scintillator layer formed on a surface of a transparent substrate, a large number of optical fibers arranged in contact with each other and disposed at a back-surface of the transparent substrate and two photomultiplier tubes. The scintillator layer is disposed close to a back-surface side of the light shielding film, the optical fibers are alternately divided into two groups and the two photomultiplier tubes are respectively connected to the two groups of optical fibers. In such a radiation detection part having the structure described above, a current pulse simultaneously outputted from both of the two photomultiplier tubes is detected as a radiation signal and a current pulse outputted from only one of the two photomultiplier tube is eliminated as noise.

PREFERRED EMBODIMENTS OF THE INVENTION

The radioactive dust monitor according to the present invention is used not only for the measurement and evaluation of radioactivity but also for the prevention of diffusion of radioactive material. For the measurement and evaluation of radioactivity, the portability is emphasized and the radioactive dust monitor is used by an individual worker or in a specific area where many workers work, as a monitor for monitoring and evaluating a working environment. Since the radioactive dust monitor does not use a suction pump, the installation site is not limited and, by installing the monitor in the vicinity of a glove box, the administration of the radioactive material concentration in air at the time of the glove box working can be strengthened. On the other hand, for the prevention of diffusion of the radioactive material, the radioactive dust monitor can be used for recovering radioactive powder in the glove box and a green house.

The measurement of the radioactive material concentration in air is performed by collecting dust on the dust collecting electrode due to the static electricity and continuously measuring the radioactivity. This implies, for example, that the light shielding film constituting the dust collecting electrode is set in a predetermined position and the radioactive material adhered to the light shielding film is continuously measured whereby the change of a radioactivity amount can be continuously monitored. The radioactive dust monitor may be provided with an alarm outputting function. An alarm setting (at a desired value of administration or the like) is performed before starting the working and when the radioactivity amount exceeds the desired value for administration, an alarm is outputted so that the leakage of the radioactive material can be found in an early stage and at the same time the internal exposure of the worker can be reduced.

Figure 1:
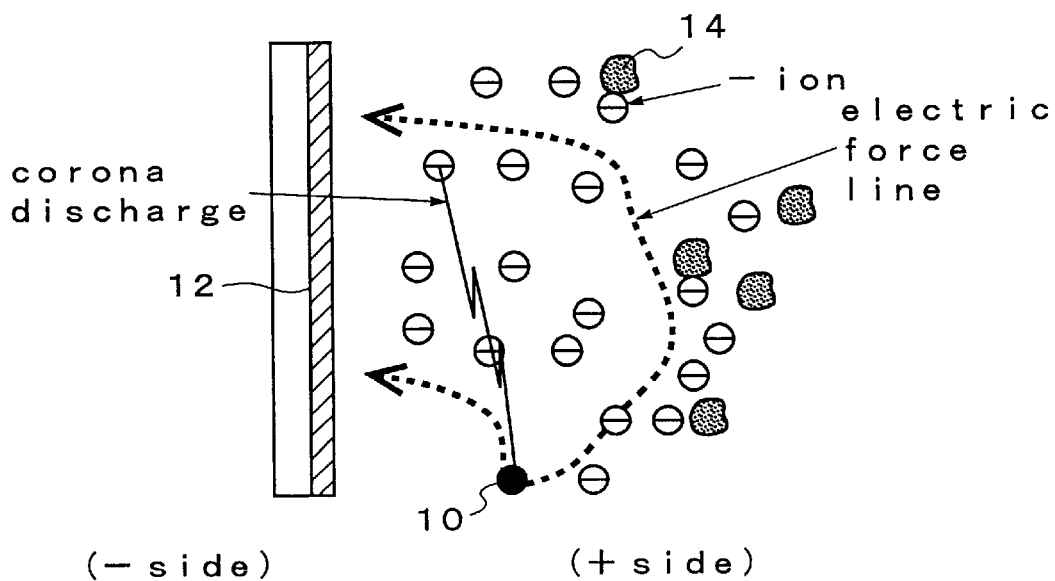
FIG. 1 is an explanatory view of an electrostatic collection type electric dust collection system.
Figure 2:
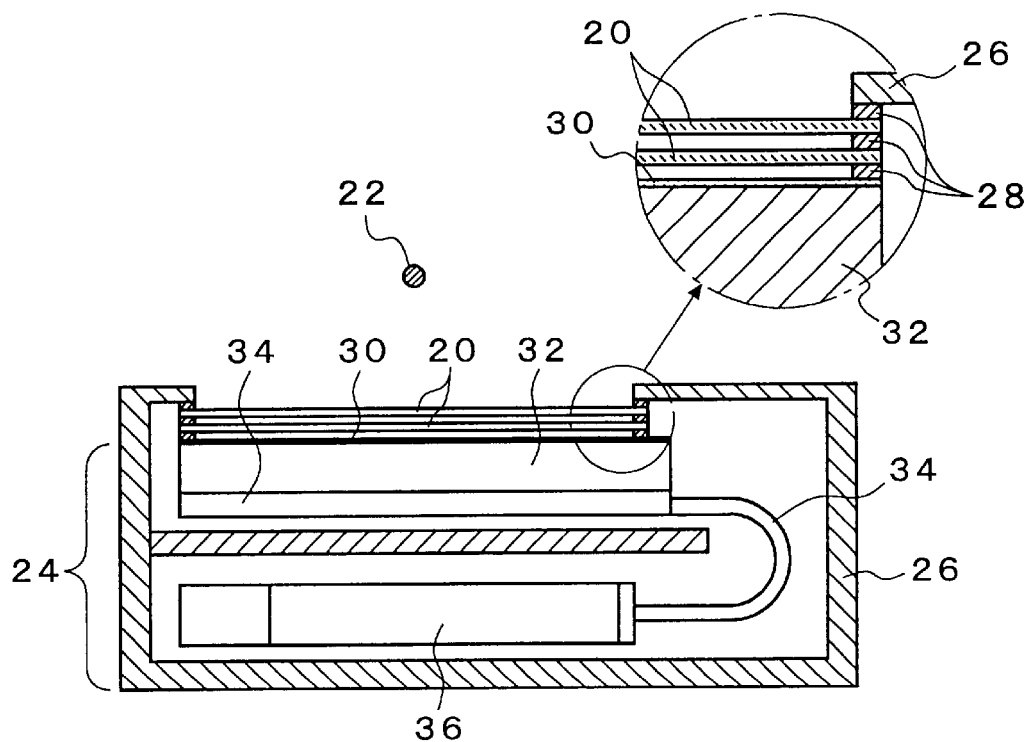
FIG. 2 is an explanatory view of one embodiment of a radioactive dust monitor according to the present invention.

FIG. 2 is an explanatory view showing one example of the radioactive dust monitor according to the present invention. The radioactive dust monitor includes light shielding films 20 which constitute a dust collecting electrode, an ionization line 22 which is extended in air in a spaced confronting relation with the light shielding films 20 and a radiation detection part 24. The radiation detection part 24 is housed in a casing 26 and the respective light shielding films 20 are detachably mounted such that they can be easily exchanged when they are ruptured or contaminated.

The light shielding film 20 is made of a material which prevents the transmission of an external light but allows the transmission of radioactive rays ($\alpha$ rays). For example, the light shielding film 20 may be made of a plastic film on a surface of which a metal layer is formed. Although the number of the light shielding film 20 may be one, they may be overlapped in a plural number when the light shielding is insufficient.

In this example, as the light shielding film 20, a so-called "aluminized" film having a structure in which aluminum is vapor-deposited on a surface of polycarbonate film is used. Aluminum is vapor-deposited in an amount of approximately 0.25 mg/cm$^2$ and exhibits a gray color. The whole film produces a conductive body and hence, this light shielding film 20 functions as the dust collecting electrode. In the example as shown in FIG. 2, two sheets of light shielding films 20 are used in an overlapped manner while inserting insulating material 28 therebetween. $\alpha$ rays radiated from the radioactive material can be shielded even by a single sheet of paper. Accordingly, a film which allows the transmission of $\alpha$ rays is required and the polycarbonate film is used as such a film. Further, the radiation detection part 24 adopts a method in which light emitted from the scintillator is detected and hence, when the external light is mixed, it gives rise to the erroneous counting. Therefore, two sheets of light shielding films 20 are used in an overlapped manner to enhance the light shielding ability. The area of the electrode is set to 150 mm×100 mm.

The radiation detection part 24 includes a transparent substrate 32 on an upper surface of which a scintillator layer 30 is formed and a photoelectric conversion part which converts light emitted from the scintillator to an electric signal. The scintillator layer 30 is disposed close to the lower light shielding light 20. As mentioned hereinbefore, in the measurement of $\alpha$ rays, the distance between the scintillator and an object to be measured (radioactive dust) should be made as small as possible to obtain high efficient measurement. Accordingly, the distance between the dust collecting electrode (the upper light shielding layer 20) and the scintillator layer 30 is set within approximately 3 mm.

The scintillator layer 30 is formed of a transparent acrylic resin substrate 32 on an upper surface of which a ZnS(Ag) scintillator is coated. The transparent acrylic resin substrate 32 functions as a light guide body for the scintillator light (fluorescence). A large number of optical fibers 34 are arranged in a row in close contact with each other and disposed under a lower surface of the transparent acrylic resin substrate 32 such that the optical fibers 34 spreads substantially the whole lower surface of the substrate 32. These optical fibers 34 are alternately divided into two group and the respective groups of the optical fibers are connected to photomultiplier tubes 36 (two in total), respectively. In this example, 160 optical fibers are aranged in close contact with each other and there is adopted two channel constitution in which 80 optical fibers for each channel are used.

A corona discharge is generated by applying a negative high voltage to the ionization line 22 and by applying a positive high voltage to the dust collecting electrode (light shielding film 20) to thereby collect the dust in air by the dust collecting electrode. When the radioactive rays ($\alpha$ rays) from the collected and accumulated radioactive dust on the dust collecting electrode reaches the scintillator layer 30, a minute light emission is generated. This light enters the optical fibers 34 through the transparent acrylic resin substrate 32, is transmitted through the optical fibers 34 and reaches the photomultiplier tubes 36. A photoelectric conversion is performed in the photomultiplier tubes 36 so that the light is detected as electric signals which are subjected to counting processing.

Figure 3:
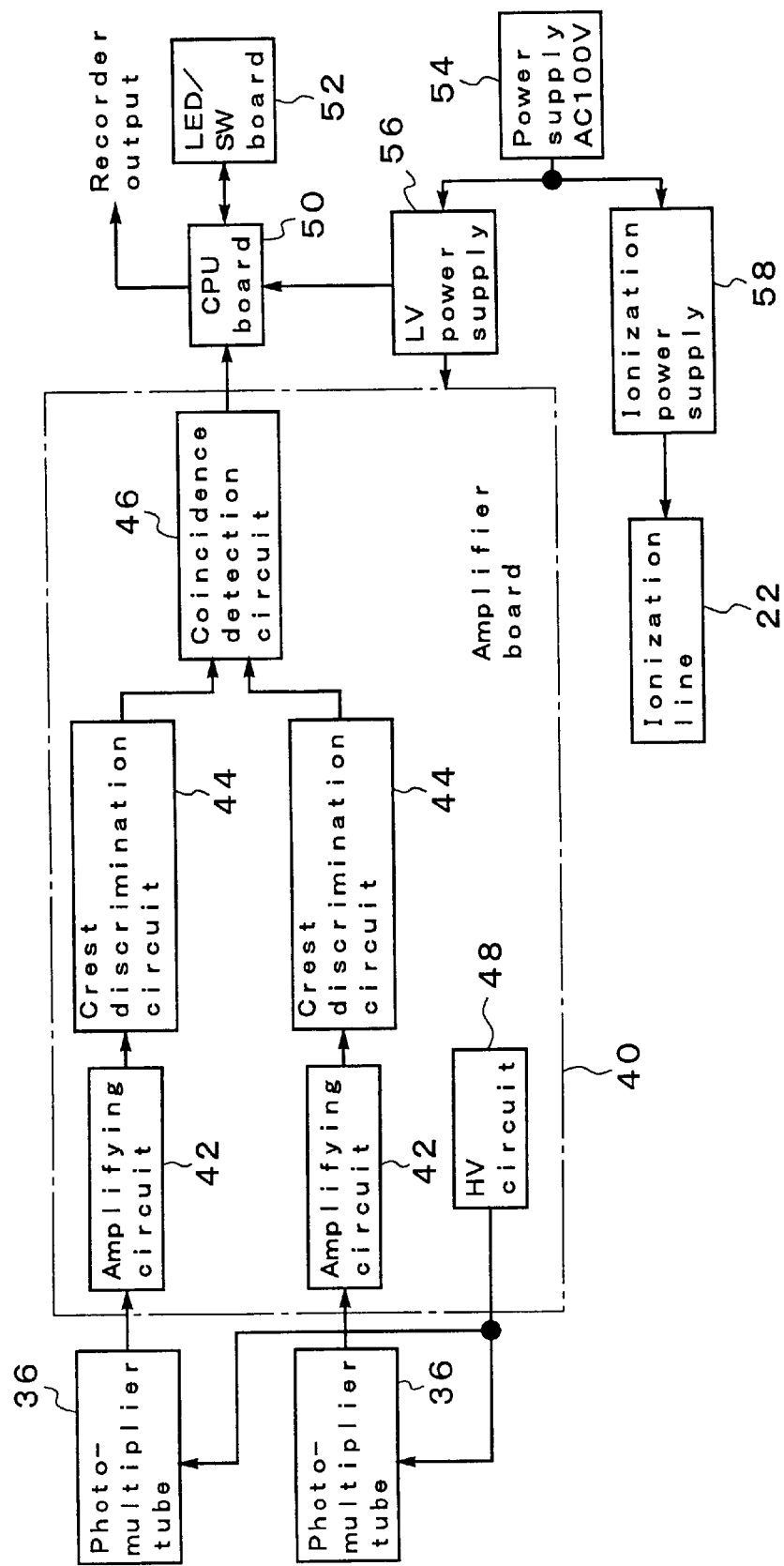
FIG. 3 an example of a block diagram of an electronic circuit used in a radioactive dust monitor according to the present invention.

FIG. 3 is a block diagram showing one example of an electronic circuit of the radioactive dust monitor. Outputs from both photomultiplier tubes 36 are inputted to an amplifier board 40. That is, these outputs are amplified by amplifying circuits 42, respectively, and the respective amplified signals are inputted to crest discrimination circuits 44. In each of the crest discrimination circuits 44, the inputted amplified signal is discriminated whether it is equal to or more than a predetermined threshold value or not, and pulse signal is outputted when the inputted amplified signal is equal to or more than the predetermined threshold value. The pulse signals from both crest discrimination circuits 44 are inputted to a coincidence detection circuit 46 and, only when the pulse signals are simultaneously outputted from both crest discrimination circuits 44, the coincidence detection circuit 46 outputs a detection pulse as a radiation signal. When the pulse signal is outputted from only one of crest discrimination circuits 44, the coincidence detection circuit 46 does not output the detection pulse and the pulse signal is eliminated as noise. Accordingly, dark current noise, amplifier noise and the like which cannot be eliminated by the crest discrimination circuits 44 can be eliminated. In the example as shown in FIG. 3, a HV (high voltage) circuit 48 is mounted on the amplifier board 40 and the photomultiplier tubes 36 are operated with the output of the HV circuit 48.

The detection pulse from the coincidence detection circuit 46 is transmitted to a CPU board 50 where the counting and the computation of counted values are carried out. Further, the CPU board 50 also conducts the control of the respective circuits. The counted values and the computed result are transmitted to a LED/SW board 52 and are subjected to LED display. With the switching manipulation of the LED/SW board 52, the setting of various functions can be performed.

A commercial power supply 54 of AC current 100 V is used as a power supply. A LV (low voltage) power supply 56 converts the current from the commercial power supply 54 into the direct current of ±12 V, +5 V or the like and supplies the direct current to the respective boards. An ionization power supply 58 is provided for generating a high voltage (arbitrarily adjustable within a range of approximately 3 kV to 6.5 kV) to ionize the dust in air and applies a predetermined high voltage to the ionization line 22. The ionization line 22 is, for example, made of tungsten+stainless steel (SUS 304) and has a diameter of approximately 0.03 mm.

As mentioned hereinbefore, this radioactive dust monitor generates the corona discharge by applying the negative high voltage to the ionization line 22 and by applying the positive high voltage to the light shielding film 20 constituting the dust collecting electrode. The dust in air is ionized to a minus ion due to the corona discharge and is collected on the light shielding film 20 to which the positive high voltage is applied. When the dust collected and accumulated on the light shielding film 20 emits the α rays, the ZnS (Ag) scintillator of the scintillator layer 30 emits light. The emitted scintillator light passes through the transparent acrylic resin substrate 32 and enters a plurality of adjacent optical fibers 34 (there is no possibility that the scintillator light enters only one optical fiber 34). Thus, the scintillator light propagates in the inside of the optical fibers 34 and reaches the respective photomultiplier tubes 36 corresponding to the group of the optical fibers 34 and is converted into electric current signals in the respective photomultiplier tubes 36. These electric current signals are amplified by the amplifying circuits 42 and are inputted to the coincidence detection circuit 46 after noise components are eliminated by the crest discrimination circuits 44. Only when both signals are simultaneously inputted into the coincidence detection circuit 46, the coincidence detection circuit 46 outputs the detection pulse and hence, the pulse output derived from the dark current noise, the amplifier noise and the like which could not be eliminated by the crest discrimination circuits 44 can be eliminated and, as a result, the S/N ratio can be enhanced.

The apparatus of the present invention can be installed in any posture including the longitudinal posture and the lateral posture. However, it should be noted that a location where the vibration is generated, a location where the temperature change is extremely large, a location where the flammable or combustible gas is generated, a location where dust is present in a large quantity, a location where the apparatus receives water drops or is splashed with water and the like are avoided as an installation site.

The actual measurement is performed as follows, for example. If the radioactive material is not adhered during the measurement period which is arbitrarily set, the exchange of the light shielding film is not necessary and only the cleaning of the surface of the light shielding film is carried out. The cleaning of the light shielding film is carried out by lightly wiping out a surface thereof with a soft cloth or the like which is impregnated with a neutral detergent. When the light shielding film is ruptured or the radioactive material (radioactivity amount) is adhered thereto, the light shielding film must be exchanged. In the location where dust-generating work is not carried out, the light shielding film can be continuously used even when the apparatus of the present invention is continuously operated, As being described hereinabove, since the radioactive dust monitor according to the present invention does not use the suction pump, the monitor can be miniaturized and light-weighted and hence, the portability thereof is enhanced. Further, since the monitor is provided with no movable portion, it can be operated silently, the stable continuous running thereof can be realized for a long period and it generates no exhaust. Therefore, the area in which the monitor is installed can be remarkably enlarged.

Further, according to the radioactive dust monitor of the present invention, since the area in which the monitor can be installed is enlarged as mentioned above and the monitor can be installed in a specific area where many workers work such as an area in the vicinity of the glove box, the leakage of the radioactive material at the time of the glove box work or the like can be discovered at an early stage. Therefore, the administration of the radioactive material concentration in air in the working environment can be strengthened.

Still further, since the radioactive dust monitor according to the present invention has a dust collecting function, the recovery of the radioactive material present in the glove box becomes possible and the amount of recovery of the radioactive material can be increased.

What is claimed is:

1. A radioactive dust monitor comprising a dust collecting electrode serving also as a radiation detecting surface, an ionization line extending in air in a spaced confronting relation with the dust collecting electrode and a radiation detection part, said radiation detection part being provided with a scintillator disposed close to said dust collecting electrode and a photoelectric conversion part converting light emitted from the scintillator into an electric signal, whereby dust in air is collected by the dust collecting electrode due to a corona discharge which is generated by applying a negative high voltage to said ionization line and by applying a positive high voltage to said dust collecting electrode, and light emitted from the scintillator due to radioactive rays radiated from the collected radioactive dust is detected by said photoelectric conversion part.

2. The radioactive dust monitor according to claim 1, wherein said dust collecting electrode comprises a metal layer formed on a plastic film, the plastic film provided with the metal layer serving as a light shielding film.

3. The radioactive dust monitor according to claim 2, wherein said radiation detection part comprises a scintillator layer formed on a surface of a transparent substrate, a large number of optical fibers arranged in contact with each other and disposed at a back-surface of said transparent substrate and two photomultiplier tubes, said scintillator layer being disposed close to a back-surface side of said light shielding film, said optical fibers being alternately divided into two groups and said two photomultiplier tubes being respectively connected to said two groups of optical fibers, whereby a current pulse simultaneously outputted from both of said two photomultiplier tubes is detected as a radiation signal and current pulse outputted from only one of said two photomultiplier tubes is eliminated as noise.

* * * * *